US008731996B2

(12) United States Patent (10) Patent No.: US 8,731,996 B2
Kumagai et al. (45) Date of Patent: May 20, 2014

(54) METHOD AND SYSTEM FOR SUPPORTING BUSINESS PROCESS DESIGN BY MODELING ROLE RELATIONSHIP

(75) Inventors: Kiyoshi Kumagai, Tokyo (JP); Yasuharu Namba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 2064 days.

(21) Appl. No.: 11/593,956

(22) Filed: Nov. 6, 2006

(65) Prior Publication Data

US 2007/0129979 A1 Jun. 7, 2007

(30) Foreign Application Priority Data

Dec. 6, 2005 (JP) ................................ 2005-351536

(51) Int. Cl.
 *G06Q 10/00* (2012.01)
 *G06Q 10/06* (2012.01)
(52) U.S. Cl.
 CPC ................................. *G06Q 10/0637* (2013.01)
 USPC ....................................................... 705/7.36
(58) Field of Classification Search
 CPC ................................................ G06Q 10/0637
 USPC ..................................................... 705/7, 7.36
 See application file for complete search history.

(56) References Cited

U.S. PATENT DOCUMENTS

| | | | |
|---|---|---|---|
| 6,272,467 B1* | 8/2001 | Durand et al. ..................... 705/5 |
| 6,414,691 B1* | 7/2002 | Nakagawa et al. ........... 345/619 |
| 6,735,568 B1* | 5/2004 | Buckwalter et al. .......... 705/319 |
| 8,073,731 B1* | 12/2011 | Rajasenan ................... 705/7.42 |
| 2003/0106058 A1* | 6/2003 | Zimmerman et al. .......... 725/46 |
| 2003/0130956 A1* | 7/2003 | Calderaro et al. ............. 705/67 |
| 2003/0149672 A1* | 8/2003 | Laskoski ...................... 705/400 |
| 2005/0159965 A1* | 7/2005 | Mann et al. ....................... 705/1 |
| 2005/0267875 A1* | 12/2005 | Bentley, III ....................... 707/3 |
| 2007/0156814 A1* | 7/2007 | Cohen ........................... 709/204 |
| 2007/0244743 A1* | 10/2007 | Vegliante et al. ............... 705/11 |
| 2008/0040314 A1* | 2/2008 | Brave et al. ....................... 707/2 |

FOREIGN PATENT DOCUMENTS

| | | |
|---|---|---|
| JP | 2001-273313 | 10/2001 |
| JP | 2003-036343 | 2/2003 |
| JP | 2003-036346 A | 2/2003 |
| JP | 2003-242339 A | 8/2003 |

OTHER PUBLICATIONS

Senior, Barbara. "Team Roles and Team Performance: Is There 'Really' a Link?" Journal of Occupational and Organizational Psychology (1997), 70, 241-258.*
Dailey, Robert C. "The Role of Team and Task Characteristics in R&D Team Collaborative Problem Solving and Productivity." Management Science (pre-1986): Nov. 1978; 24, 15, p. 1579.*

* cited by examiner

*Primary Examiner* — Susanna M Meinecke Diaz
(74) *Attorney, Agent, or Firm* — Kilpatrick Townsend & Stockton LLP

(57) ABSTRACT

The invention provides a method for extracting and evaluating risk information and synergy information arising out of role relationships among persons which are an essential part of a business process and realizing a safe and appropriate business process.

A business process design support system in the invention includes: the business process definition unit 201 of the business process definition system 2 which receives role relationship information defined by a designer, etc. and transmits the information to the risk/synergy evaluation system 3; the risk/synergy extraction unit 301 which extracts risk/synergy factors and occurrence mechanism information based on the role relationship information; and a risk/synergy measures evaluation unit 401 which calculates risk/synergy measures candidates and estimated effects based on the risk/synergy factors and the occurrence mechanism information.

8 Claims, 20 Drawing Sheets

FIG. 7
(BUSINESS PROCESS PATTERNS)

T221

| JOB NAME | BUSINESS PROCESS PATTERN |
|---|---|
| MUTUAL-FUND SALES JOB | TRANSACTION RECEPTION → RECEPTION ACKNOWLEDGMENT → BUYING ORDER → CONTRACT NOTICE → SETTLEMENT → TRANSACTION REPORT |
| STOCK BROKERAGE JOB | TRANSACTION RECEPTION → RECEPTION ACKNOWLEDGMENT → ORDER INSPECTION → ORDER ON MARKET → CONTRACT NOTICE → SETTLEMENT → TRANSACTION REPORT |
| REAL-ESTATE AGENT JOB | PURCHASE RECEPTION → PRICE ESTIMATE → LOAN RECEPTION → LOAN SCREENING → RESULT NOTICE → RIGHT REGISTRATION → RIGHT TRANSFER |
| ... | ... |
| ... | ... |
| ... | ... |

FIG. 8
(ROLE RELATIONSHIP DEFINITION)

T222

| SCENE NAME | NUMBER OF ACTORS | ACTOR ATTRIBUTE | ROLE RELATIONSHIP | ACTOR ENVIRONMENT |
|---|---|---|---|---|
| TRANSACTION RECEPTION | 3 | ATTRIBUTE: 1 | ROLE: 1 | ENVIRONMENT: 1 |
| RECEPTION ACKNOWLEDGMENT | 3 | ATTRIBUTE: 2 | ROLE: 2 | ENVIRONMENT: 2 |
| ORDER INSPECTION | 3 | ATTRIBUTE: 3 | ROLE: 3 | ENVIRONMENT: 3 |
| ... | ... | ... | ... | ... |
| ... | ... | ... | ... | ... |
| ... | ... | ... | ... | ... |

FIG. 9
(ACTOR'S ATTRIBUTE DEFINITION (ATTRIBUTE:1))

| ATTRIBUTE:1 | EXPERIENCE ATTRIBUTE | POWER ATTRIBUTE | MORAL ATTRIBUTE | MOTIVATION ATTRIBUTE | ... |
|---|---|---|---|---|---|
| ACTOR A | 1.9 | 1 | 1.3 | 1.5 | ... |
| ACTOR B | 1.5 | 1 | 1.8 | 1.6 | ... |
| ACTOR C | 1 | 1 | 1.1 | 1 | ... |

T222a

FIG. 10
(ACTOR'S ROLE DEFINITION (ROLE:1))

| ROLE:1 | →ACTOR B | →ACTOR C | ... |
|---|---|---|---|
| ACTOR A | - | - | ... |
| ACTOR B |  | GUIDANCE | SALES | ... |
| ACTOR C | - | SALES | ... |

T222b

FIG. 11
(ACTOR'S ENVIRONMENT DEFINITION (ENVIRONMENT:1))

| ENVIRONMENT:1 | QUOTA ENVIRONMENT | RESPONSIBILITY ENVIRONMENT | COMPENSATION ENVIRONMENT | PENALTY ENVIRONMENT | ... |
|---|---|---|---|---|---|
| ACTOR A | 1.7 | 1.8 | 1.5 | 1.5 | ... |
| ACTOR B | 1.7 | 1.7 | 1.3 | 1.5 | ... |
| ACTOR C | 1 | 1 | 1 | 1 | ... |

T222c

FIG. 12
(ROLE PATTERN LIST)

T321

| NUMBER OF ACTORS | ROLE PATTERN | DEFINITION INFORMATION OF RISK/SYNERGY CAUSES AND EFFECTS |
|---|---|---|
| 2 | 2a | R/S2a |
| 2 | 2b | R/S2b |
| ... | ... | ... |
| 3 | 3a | R/S3a |
| ... | ... | ... |
| 4 | 4a | R/S4a |
| ... | ... | ... |

FIG. 13
(ROLE PATTERN (3a))

T321a

| ROLE PATTERN 3a | → ACTOR A | → ACTOR B | → ACTOR C |
|---|---|---|---|
| ACTOR A | - | GUIDANCE | SALES |
| ACTOR B | - | - | SALES |
| ACTOR C | - | - | - |

FIG. 14

(DEFINITION INFORMATION OF RISK/SYNERGY CAUSES AND EFFECTS "CIRCUMSTANCES → MOTIVATION" (R/S3a))

T321b1

| CASUAL MODEL R/S3a | | ACTOR A'S MOTIVATION | | | | ACTOR B'S MOTIVATION | | ACTOR C'S MOTIVATION | |
|---|---|---|---|---|---|---|---|---|---|
| | | → JEALOUSY A | → CARELESSNESS A | ... | ... | → JEALOUSY B | ... | → JEALOUSY C | ... |
| ACTOR A'S CIRCUMSTANCES | EXPERIENCE ATTRIBUTE A | 0 | 0.5 | ... | ... | -0.3 | ... | 0 | ... |
| | POWER ATTRIBUTE A | 0 | 0.6 | ... | ... | -0.3 | ... | 0 | ... |
| | MORAL ATTRIBUTE A | -0.3 | 0 | ... | ... | -0.5 | ... | 0 | ... |
| | ... | ... | ... | ... | ... | ... | ... | ... | ... |
| | QUOTA ENVIRONMENT A | 0 | -0.5 | ... | ... | 0 | ... | 0 | ... |
| | RESPONSIBILITY ENVIRONMENT A | 0 | -0.3 | ... | ... | 0 | ... | 0 | ... |
| | ... | ... | ... | ... | ... | ... | ... | ... | ... |
| ACTOR B'S CIRCUMSTANCES | EXPERIENCE ATTRIBUTE B | 0.4 | 0.2 | ... | ... | 0.3 | ... | 0 | ... |
| | POWER ATTRIBUTE B | ... | ... | ... | ... | ... | ... | ... | ... |
| | MORAL ATTRIBUTE B | ... | ... | ... | ... | ... | ... | ... | ... |
| | ... | ... | ... | ... | ... | ... | ... | ... | ... |
| ACTOR C'S CIRCUMSTANCES | EXPERIENCE ATTRIBUTE C | 0 | 0 | ... | ... | 0 | ... | 0 | ... |
| | POWER ATTRIBUTE C | ... | ... | ... | ... | ... | ... | ... | ... |
| | MORAL ATTRIBUTE C | ... | ... | ... | ... | ... | ... | ... | ... |
| | ... | ... | ... | ... | ... | ... | ... | ... | ... |

FIG. 15

(DEFINITION INFORMATION OF RISK/SYNERGY CAUSES AND EFFECTS "MOTIVATION → FACTORS" (R/S3a))

T321b2

| CASUAL MODEL 2 R/S3a | | RISK FACTORS | | | SYNERGY FACTORS | | |
|---|---|---|---|---|---|---|---|
| | | →INFORMATION BLOCKAGE | →PROVISION OF FALSE INFORMATION | ... | →MUTUAL INCITEMENT | →KNOW-HOW SHARING | ... |
| ACTOR A'S MOTIVATION | JEALOUSY A | 0.5 | 0.6 | ... | 0 | -0.6 | ... |
| | CARELESSNESS A | 0.2 | 0.1 | ... | -0.3 | 0 | ... |
| | EXHAUSTION A | 0.2 | 0.1 | ... | -0.5 | -0.4 | ... |
| | RIVALRY A | 0.7 | 0.4 | ... | 0.9 | -0.8 | ... |
| | ... | ... | ... | ... | ... | ... | ... |
| ACTOR B'S MOTIVATION | JEALOUSY B | 0.3 | 0.1 | ... | 0 | -0.3 | ... |
| | CARELESSNESS B | ... | ... | ... | ... | ... | ... |
| | EXHAUSTION B | ... | ... | ... | ... | ... | ... |
| | ... | ... | ... | ... | ... | ... | ... |
| ACTOR C'S MOTIVATION | JEALOUSY C | 0 | 0 | ... | 0 | 0 | ... |
| | CARELESSNESS C | ... | ... | ... | ... | ... | ... |
| | EXHAUSTION C | ... | ... | ... | ... | ... | ... |
| | ... | ... | ... | ... | ... | ... | ... |

FIG. 16

(RISK/SYNERGY OCCURRENCE MECHANISM INFORMATION "CIRCUMSTANCES → MOTIVATION" (TRANSACTION RECEPTION SCENE))

T323b1

| CASUAL MODEL (TRANSACTION RECEPTION) | | ACTOR A'S MOTIVATION | | | ACTOR B'S MOTIVATION | | ACTOR C'S MOTIVATION | |
|---|---|---|---|---|---|---|---|---|
| | | →JEALOUSY A | →CARELESSNESS A | ... | →JEALOUSY B | ... | →JEALOUSY C | ... |
| ACTOR A'S CIRCUMSTANCES | EXPERIENCE ATTRIBUTE A | 0 | 0.95 | ... | -0.57 | ... | 0 | ... |
| | POWER ATTRIBUTE A | 0 | 0.6 | ... | -0.3 | ... | 0 | ... |
| | MORAL ATTRIBUTE A | -0.39 | 0 | ... | -0.65 | ... | 0 | ... |
| | ... | ... | ... | ... | ... | ... | ... | ... |
| | QUOTA ENVIRONMENT A | 0 | -0.85 | ... | 0 | ... | 0 | ... |
| | RESPONSIBILITY ENVIRONMENT A | 0 | -0.54 | ... | 0 | ... | 0 | ... |
| | ... | ... | ... | ... | ... | ... | ... | ... |
| ACTOR B'S CIRCUMSTANCES | EXPERIENCE ATTRIBUTE B | 0.6 | 0.3 | ... | 0.45 | ... | 0 | ... |
| | POWER ATTRIBUTE B | ... | ... | ... | ... | ... | ... | ... |
| | MORAL ATTRIBUTE B | ... | ... | ... | ... | ... | ... | ... |
| ACTOR C'S CIRCUMSTANCES | EXPERIENCE ATTRIBUTE C | 0 | 0 | ... | 0 | ... | 0 | ... |
| | POWER ATTRIBUTE C | ... | ... | ... | ... | ... | ... | ... |
| | MORAL ATTRIBUTE C | ... | ... | ... | ... | ... | ... | ... |
| | ... | ... | ... | ... | ... | ... | ... | ... |
| TOTAL OCCURRENCES | | 3.9 | 2.2 | ... | 4.1 | ... | 0 | ... |

FIG. 17

(RISK/SYNERGY OCCURRENCE MECHANISM INFORMATION "MOTIVATION → FACTORS" (TRANSACTION RECEPTION SCENE))

T323b2

| CASUAL MODEL 2 (TRANSACTION RECEPTION) | | RISK FACTORS | | | SYNERGY FACTORS | | |
|---|---|---|---|---|---|---|---|
| | | → INFORMATION BLOCKAGE | → PROVISION OF FALSE INFORMATION | ... | → MUTUAL INCITEMENT | → KNOW-HOW SHARING | ... |
| ACTOR A'S MOTIVATION | JEALOUSY A | 1.95 | 2.34 | ... | 0 | -2.34 | ... |
| | CARELESSNESS A | 0.44 | 0.22 | ... | -0.66 | 0 | ... |
| | EXHAUSTION A | 0.21 | 0.13 | ... | -0.45 | -0.45 | ... |
| | RIVALRY A | 0.75 | 0.44 | ... | 0.91 | -0.81 | ... |
| | ... | ... | ... | ... | ... | ... | ... |
| ACTOR B'S MOTIVATION | JEALOUSY B | 1.23 | 0.41 | ... | 0 | -1.23 | ... |
| | CARELESSNESS B | ... | ... | ... | ... | ... | ... |
| | EXHAUSTION B | ... | ... | ... | ... | ... | ... |
| ACTOR C'S MOTIVATION | JEALOUSY C | 0 | 0 | ... | 0 | 0 | ... |
| | CARELESSNESS C | ... | ... | ... | ... | ... | ... |
| | EXHAUSTION C | ... | ... | ... | ... | ... | ... |
| TOTAL OCCURRENCES | | 4.5 | 3.2 | ... | 1.2 | 0.3 | ... |

FIG. 18
(PROFIT-AND-LOSS INFORMATION) T322

| RISK/SYNERGY FACTORS | CATEGORY | OCCURRENCE FREQUENCY (TIMES/YEAR) | PROFIT-AND-LOSS AMOUNT (10K¥/OCCURRENCE) |
|---|---|---|---|
| INFORMATION BLOCKAGE | RISK | 1.5 | -1000 |
| PROVISION OF FALSE INFORMATION | RISK | 0.9 | -800 |
| INTERFERENCE IN JOB | RISK | 0.6 | -500 |
| HIGH-PRESSURE SALES | RISK | 0.2 | -4000 |
| MUTUAL INCITEMENT | SYNERGY | 3.0 | +150 |
| KNOW-HOW SHARING | SYNERGY | 2.5 | +200 |
| MUTUAL BACKUP | SYNERGY | 2.0 | +300 |
| ... | ... | ... | ... |

FIG. 19
(MEASURES PATTERN (INFORMATION BLOCKAGE)) T421

| MEASURES CANDIDATE (INFORMATION BLOCKAGE) | MEASURES CATEGORY | TARGET CATEGORY | EFFECT OF MEASURES |
|---|---|---|---|
| JOB RULE EDUCATION | AWARENESS RAISING | LOSS PREVENTION | CARELESSNESS -1 |
| DISCLOSURE OF FRAUD | AWARENESS RAISING | LOSS PREVENTION | MOTIVATION ATTRIBUTE -1, CARELESSNESS -2 |
| JOB SUPERVISION | WORK RESTRUCTURING | LOSS PREVENTION | MORAL ATTRIBUTE +1, COMPETITIVENESS ATTRIBUTE +2, CARELESSNESS -3, RIVALRY +2, DEFENSIVENESS -3 |
| EXECUTION OF AUDIT | WORK RESTRUCTURING | LOSS REDUCTION | MORAL ATTRIBUTE +2, CARELESSNESS -2, DEFENSIVENESS -2 |
| PERIODICAL JOB TRANSFER | ORGANIZATIONAL REFORM | LOSS REDUCTION | EXPERIENCE ATTRIBUTE -2, MORAL ATTRIBUTE +2, MOTIVATION ATTRIBUTE -2 |
| ... | ... | ... | ... |

CONCEPTUAL DRAWING OF ROLE RELATIONSHIP IN BUSINESS PROCESS

WINDOW FOR ROLE RELATIONSHIP DEFINITION

WINDOW FOR ANALYSIS OF RISK/SYNERGY FACTORS

WINDOW FOR CAUSE-AND-EFFECT RELATIONS OF RISK/SYNERGY

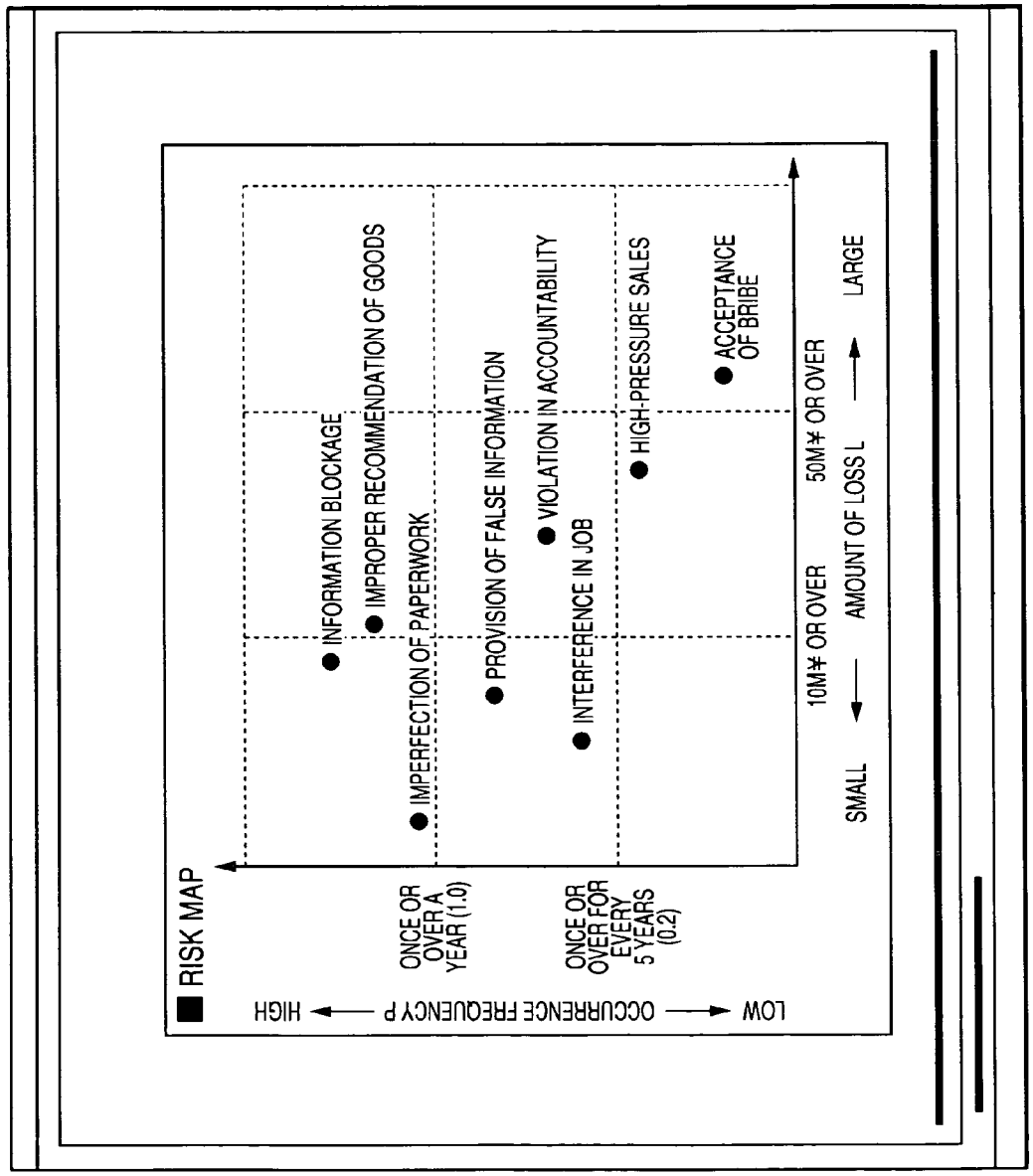

FIG. 26

WINDOW FOR EVALUATION OF RISK/SYNERGY MEASURES

■ RISK/SYNERGY MEASURES PATTERN FOR "INFORMATION BLOCKAGE"   LARGE: ★★★   MEDIUM: ★★   SMALL: ★
※ PREDICTION EFFECT

| RISK/SYNERGY MEASURES | AWARENESS RAISING | WORK RESTRUCTURING | ORGANIZATIONAL REFORM |
|---|---|---|---|
| RISK HEDGING (AVOIDANCE) | | · DEMOLITION OF GUIDANCE ★★★ | |
| REDUCTION IN LOSS FREQUENCY (LOSS PREVENTION) | · JOB RULE EDUCATION ★★<br>· JOB INSPECTION ★<br>· DISCLOSURE OF GUIDANCE RESULTS ★★<br>· DISCLOSURE OF FRAUD ★ | · JOB SUPERVISION ★★★<br>· REVIEW OF AUTHORITY/ RESPONSIBILITY ★★<br>· REVIEW OF COMPENSATION/ PENALTY ★★ | · CHANGE OF PERSON-IN-CHARGE ★ |
| REDUCTION IN LOSS AMOUNT (LOSS REDUCTION) | | · EXECUTION OF AUDIT ★<br>· INTRODUCTION OF INTERNAL WHISTLE-BLOWING SYSTEM ★ | · PERIODIC JOB TRANSFER ★ |
| SHIFTING AND RETENTION OF LOSS (TRANSFER AND RETENTION) | | · LOSS COMPENSATION CONTRACT ★ | |

METHOD AND SYSTEM FOR SUPPORTING BUSINESS PROCESS DESIGN BY MODELING ROLE RELATIONSHIP

CLAIM OF PRIORITY

The present application claims priority from the Japanese patent application JP2005-351536 filed on Dec. 6, 2005, the content of which is hereby incorporated by reference into this application.

BACKGROUND OF THE INVENTION

The present invention relates to a method for supporting business process design using an information processor, and more specifically to a method for optimizing the balance of role relationships and designing a safe, suitable business process by extracting/analyzing information on risks and synergy arising from role relationships among people who are involved in a business process and taking measures when a business process designer newly build, modify or rebuild a business process.

As a conventional technique, a method for executing analysis and design of a business process is disclosed in Japanese Patent Laid-open No. 2001-273313 (Patent Reference 1). In this method, a business process is analyzed and designed by visualizing and patterning the business process with paying attention to dependency between activities in the business process. Further, Japanese Patent Laid-open No. 2001-273313 provides a method for designing a business process with high reusability, wherein information on dependency relationships between activities are stored in a database as general process knowledge and specific characteristics are defined according to business domains. Japanese Patent Laid-open No. 2003-36343 (Patent Reference 2) disclose a method for accumulating events that involve losses and managing operational risks based on the events accumulated. In Japanese Patent Laid-open No. 2003-36343, risks are calculated using predefined process status of events and loss distributions based on the process status.

SUMMARY OF THE INVENTION

In the meantime, new business cooperation such as M&A or outsourcing has been increased recently among enterprises or departments. Business cooperation will be more increased in the future. To make it successful, it is necessary to appropriately develop a new business process that combines superior resources owned by enterprises.

To achieve a correct business process, on the other hand, challenges are not only to establish an information system, but also take measures for dealing with risk factors such as deteriorated service quality and information leaks that are arising out of cooperation among persons having different culture and interests. In particular, the government has a plan to introduce the Sarbanes-Oxley act which makes it obligatory to perform internal control of enterprises. Therefore, it is necessary to establish a support technique for developing and managing appropriate internal control functions.

Recently, because of frequent scandals of enterprises caused by their excessive pursuit of profits, Corporate Social Responsibility (CSR) has drawn people's attention. The essence of CSR is to maximize synergy by nurturing culture, that is, "social contributions" within an enterprise and encouraging motivation of employees. To have CRS take root, combination of CRS with business processes that are a core of corporate activities is necessary. Also, it is necessary to establish environments for managing synergy among persons with a good balance and realizing continuous improvement of the corporate value.

From the above, in the management of a business process, it is demanded that factors causing risks or synergy (hereinafter referred to as "risk/synergy factors") related to the business process can correctly be extracted and managed. For example, like the conceptual drawing of role relationships in sales processes in a business process shown in FIG. 20, a safe, appropriate business process is realized by sharing roles (sales, receiving complaints and management) among persons (sales representative, customer and sales manager, for example) and maintaining adequate role relationships (division of powers). It is considered that collapse of the balance of the role relationships may cause a risk. On the other hand, maintaining adequate balance will create synergy. Here, it is preferable that the balance among role relationships can be adequately managed by appropriately visualizing role relationships among persons and also by efficiently extracting risk/synergy factors existing in the business process.

However, in the technology disclosed in Patent Reference 1, although it is theoretically possible to design a business process with high reusability by recombining activity patterns of a business process, role relationships among persons which is the essential part of the business process are not taken into consideration and the balance among role relationships is likely to collapse when the business process is recombined. Therefore, it is not possible to build a highly-reliable business process. In addition, in the technology disclosed in Patent Reference 2, although it is possible to calculate statistical information (estimated value) of operational risks in a business process, it is not possible to clarify a structure that generates a risk and take any fundamental measures.

An object of the present invention is to provide a technology for supporting business process design for optimizing balance among role relationships existing in a business process and rapidly and appropriately creating a highly-reliable business process, by defining role relationships among persons which are the essential part of the business process, forming patterns of the mechanism that causes risk/synergy factors arising out of relationships among roles and mentality/environment, etc., and using such patterns.

To achieve the above-stated object, the primary part of the present invention is to form patterns of risk/synergy factors and generating mechanisms that arise out of role relationships among persons in a business process, store the information of the patterns in a memory device, and when a business process designer, etc. newly create, or modify/create the business process, extract the risk/synergy factors by matching the role relationship information inputted and the role patterns. Further, the present invention is to form patterns of measures for each risk/synergy factor and store the information of the patterns in a memory device, and extract the measures candidates for the extracted risk/synergy factors based on the measures patterns to estimate/evaluate effects of the executions.

BRIEF DESCRIPTION OF THE DRAWINGS

FIG. 7 is a configuration diagram of a table on which business process patterns are stored;

FIG. 8 is a configuration diagram of a table on which role relationship definitions are stored;

FIG. 9 is a configuration diagram of a table on which attribute definitions of actors are stored;

FIG. 10 is a configuration diagram of a table on which role relationships of actors are stored;

FIG. 11 is a configuration diagram of a table on which environment definitions of actors are stored;

FIG. 12 is a configuration diagram of a table on which a role pattern list is stored;

FIG. 13 is a configuration diagram of a table on which role patterns are stored;

FIG. 14 is a configuration diagram of a table on which definition information of risk/synergy causes and effects "Circumstances→Motivation" is stored;

FIG. 15 is a configuration diagram of a table on which definition information of risk/synergy causes and effects "Motivation→Factors" is stored;

FIG. 16 is a configuration diagram of a table on which definition information of risk/synergy occurrence mechanism information "Circumstances→Motivation" is stored;

FIG. 17 is a configuration diagram of a table on which definition information of risk/synergy occurrence mechanism information "Motivation→Factors" is stored;

FIG. 18 is a conceptual drawing of a table on which profit-and-loss information is stored;

FIG. 19 is a conceptual drawing of a table on which measures patterns are stored;

FIG. 25 is a diagram showing an example window for evaluation of risk factors; and FIG. 26 is a diagram showing an example window for evaluation of risk/synergy measures.

DESCRIPTION OF THE PREFERRED EMBODIMENTS

Figure 1:
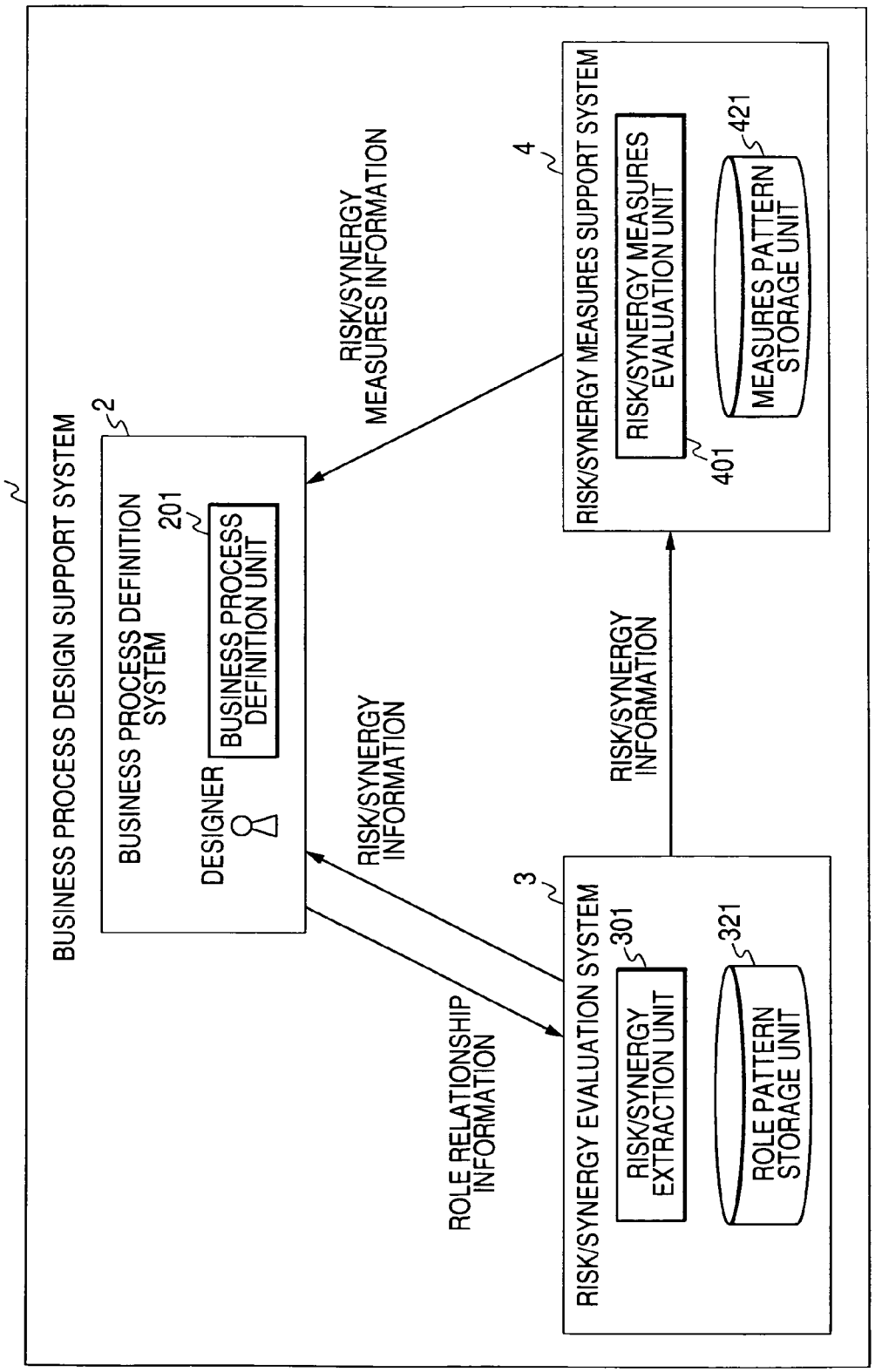
FIG. 1 is a conceptual drawing of a business process design support system.

As shown in FIG. 1, in the present embodiment, a description will be made of the case where, when a business process designer, etc. newly create, modify, or recreate a business process, the designer builds a business process design support system 1 consisting of a business process definition system 2, a risk/synergy evaluation system 3, and a risk/synergy measures support system 4. The business process definition system 2 receives role relation information that is definition information of a business process to be input by the business process designer, etc. The risk/synergy evaluation system 3 extracts risk/synergy by using role patterns according to the role relationship information. The risk/synergy measures support system 4 supports risk/synergy measures using measures patterns based on the risks/synergy extracted. It should be noted that the business process definition system 2, the risk/synergy evaluation system 3 and the risk/synergy measures support system 4 may be installed in a system device or in separate system devices. When the systems are to be installed in separate system devices and remotely operated, the business process definition system 2, the risk/synergy evaluation system 3 and the risk/synergy measures support system 4 mutually transmit and receive information via an open network represented by the Internet or an exclusive line.

Hereinafter, a business process design support system according to the embodiment that is operated under the above-stated configuration will be described in detail, taking a brokerage business of a bank as an example, in the case where a banker and a dispatched financial advisor (FA) from a securities company cooperatively sell securities to a customer of the bank. The brokerage business performed by a bank is a new business model that has been released in December 2004 in Japan. In this example, the bank which does not have know-how on sales of securities employs a dispatched FA from a cooperative securities company and the bank assigns selling of securities to customers and training of bankers to the FA. On the other hand, there is a concern about problems among bankers, customers, and the dispatched FA who is external staff. Thus, it is requested to establish appropriate role relationships in the business process.

(1) Outline of the Embodiment

Figure 2:
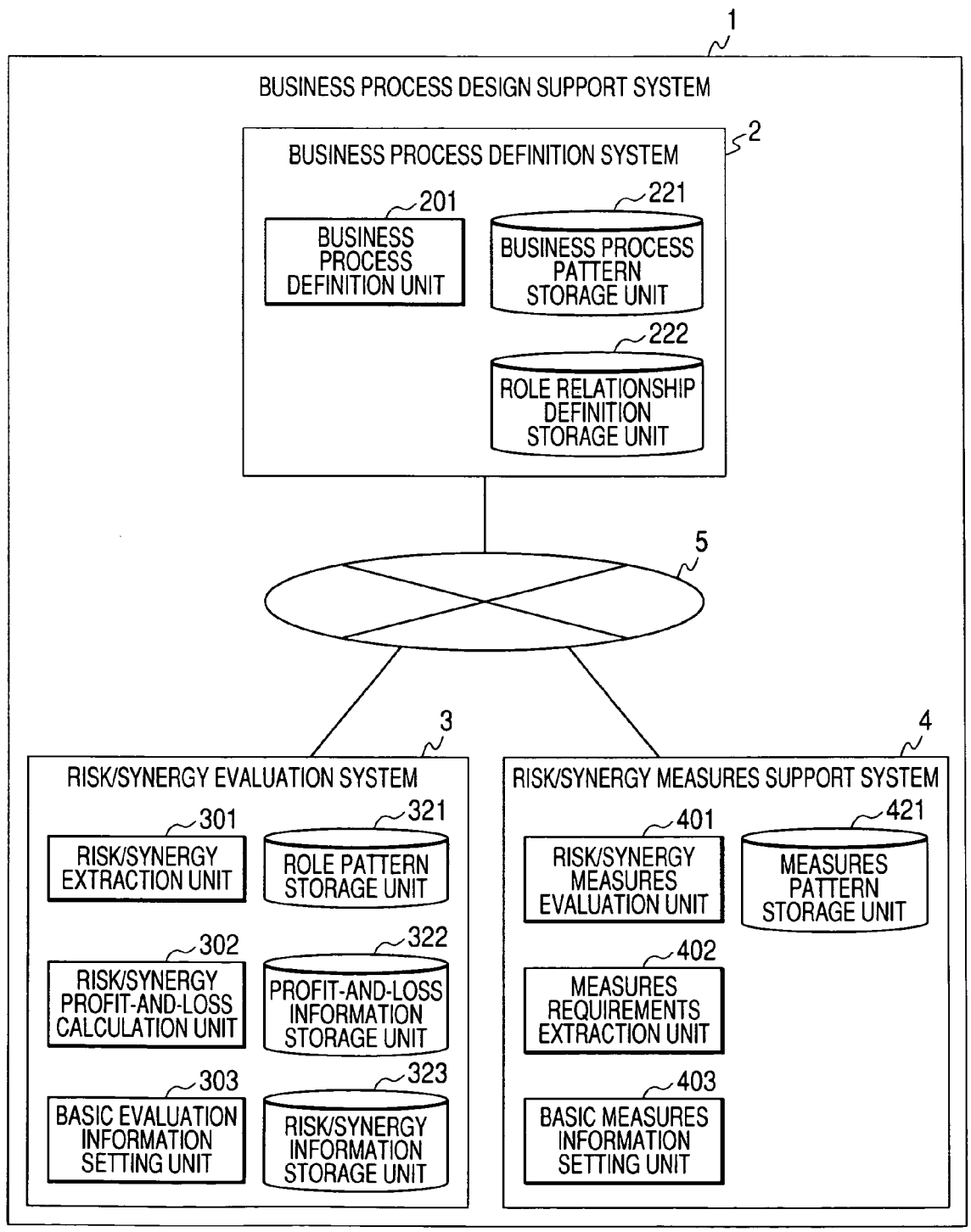
FIG. 2 is a configuration diagram of a business process design support system.

In the embodiment, a description will be made of the case where the business process definition system 2, the risk/synergy evaluation system 3 and the risk/synergy measures support system 4 are each installed in different system devices and operated at a remote location. FIG. 2 illustrates a configuration of the business process design support system 1 according to the embodiment. In the business process design support system, a communication network 5 is connected with the business process definition system 2, the risk/synergy evaluation system 3 and the risk/synergy measures support system 4. The business process definition system 2 receives role relationship information, which is definition information of the business process, from a business process designer, etc. The risk/synergy evaluation system 3 extracts risk/synergy factors and calculates estimated profit-and-loss values by using role patterns according to the role relationship information. The risk/synergy measures support system 4 supports establishment of the risk/synergy measures by using measures patterns according to the risk/synergy factors thus extracted. The communication network 5 may be a LAN, the Internet or a network that uses any other wired or wireless lines. The business process definition system 2, the risk/synergy evaluation system 3 and the risk/synergy measures support system 4 are computers each of which includes a CPU for calculation, a storage device for storing data or programs (a RAM, a ROM, a hard disk, or the like, for example) and a communication device for communication with externals via the network 5.

(2) Hardware Configuration

Figure 3:
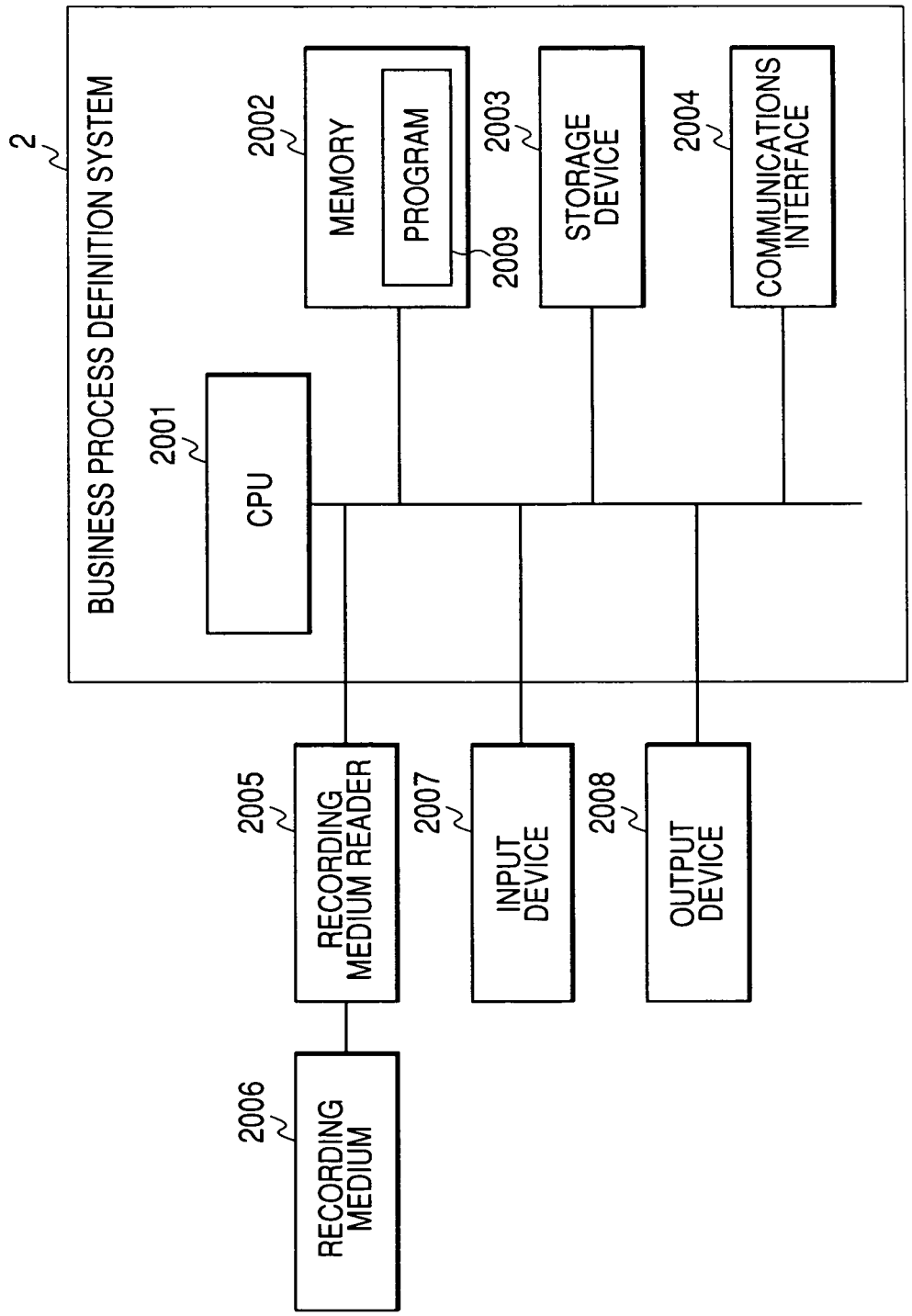
FIG. 3 is a diagram showing a hardware configuration of a business process definition system 2.

FIG. 3 illustrates a typical hardware configuration of the computer (management server) that is used for the business process definition system 2. The computer having the configuration shown in FIG. 3 is also used for the risk/synergy evaluation system 3 and the risk/synergy measures support system 4. As shown in FIG. 3, the business process definition system 2 includes a CPU 2001, a memory 2002, a storage device 2003, a communications interface 2004, a recording medium reader 2005, a recording medium 2006, an input device 2007 and an output device 2008 including a display device.

The CPU 2001 controls the whole business process definition system 2, and executes a program 2009 stored in the memory 2002 to realize various functions. The recording medium reader 2005 is a device to read programs or data that is stored on the recording medium 2006. Program or data that is read by the recording medium reader 2005 is stored in the memory 2002. Accordingly, the program 2009 which is stored in the memory 2002, for example, can be read from the recording medium 2006 by using the recording medium reader 2005 and stored in the memory 2002. For the recording medium 2006, a CD-ROM or a DVD-ROM, a hard disk, a flexible disk, a semiconductor memory, a magnetic tape, or the like may be used, for example. The recording medium reader 2005 may be installed in the business process definition system 2, or may be installed outside the business process definition system 2. The input device 2007 is used by an operator, etc. for inputting data, etc. to the business process definition system 2. For the input device 2007, a keyboard, a mouse, a microphone, or the like is used for example. The output device 2008 is a device to output information to external devices. For the output device 2008, a display, a printer, a speaker, or the like is used for example. The communications interface 2004 is a device to communicate with an external device of the risk/synergy evaluation system 3 or the risk/synergy measures support system 4 while being connected with the communication network 5.

A business process pattern storage unit 221, a role relationship definition storage unit 222, a role pattern storage unit 321, a profit-and-loss information storage unit 322, a risk/synergy information storage unit 323 and a measures pattern storage unit 421, are installed on the storage device 2003 as shown in FIG. 2. In addition, a business process definition unit 201, a risk/synergy extraction unit 301, a risk/synergy profit-and-loss calculation unit 302, a basic evaluation information setting unit 303, a risk/synergy measures evaluation unit 401, a measures requirements extraction unit 402 and a basic measures information setting unit 403 are stored in the memory 2002, and they are realized as programs executed by the CPU 2001. In addition, data entered is input to each computer via the input device 2007. Further, executing the programs displays the windows exemplified below on the output device 2008.

(3) Business Process Definition System 2

Figure 22:
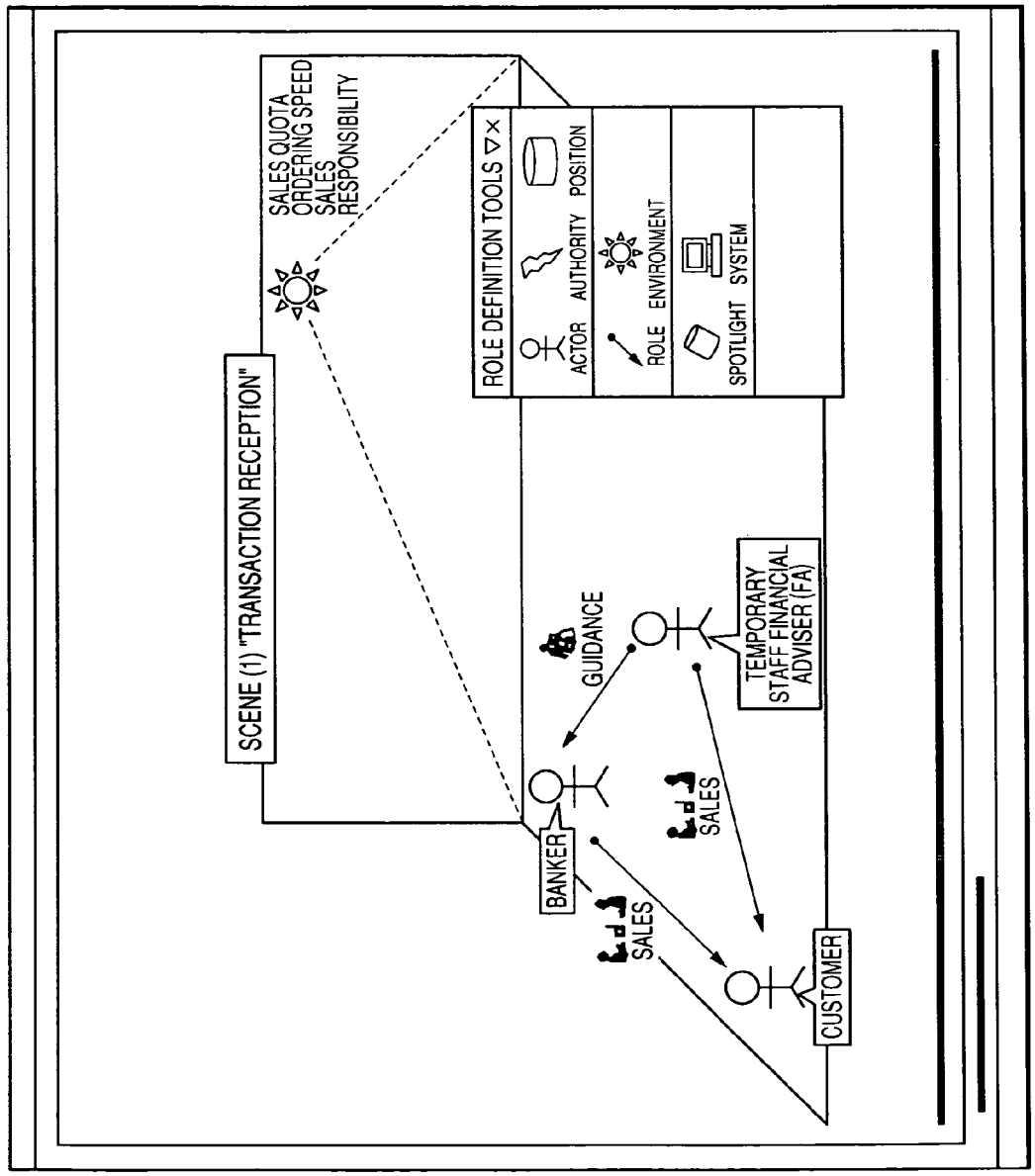
FIG. 22 is a diagram showing an example window for role relationship definition.

In the business process definition system 2 shown in FIG. 2, the business process definition unit 201 includes functions for: dividing a business process into units of scene or activity based on a pattern of business process according to contents of businesses that are stored in the business process pattern storage unit 221; receiving role relationship information such as actors (persons involved), attributes of actors (i.e., experience attribute, responsibility attribute, moral attribute, etc.), roles played by actors (i.e., sales, guidance, supervision) and environments to which actors are subjected (i.e., quota environment, responsibility environment, penalty environment, etc.), which are defined and entered according to scenes by the business process designer as shown in the window for role relationship definition in FIG. 22; storing such attributes, roles and environments in the role relationship definition storage unit 222; and transmitting them to the risk/synergy evaluation system 3. The terms "scene" or "activity" used here imply that a business process is divided into some scenes or activities when a role relationship among actors changes. The terms have the similar concept to "scene" used in theatrical performance.

FIG. 22 shows a status wherein the business process definition unit 201 displays a window called "transaction reception" and a designer defines actors, roles to be performed by the actors and environments to which the actors are subjected by using role definition tool icons. Attribute definitions of an actor will be described later.

Figure 21:
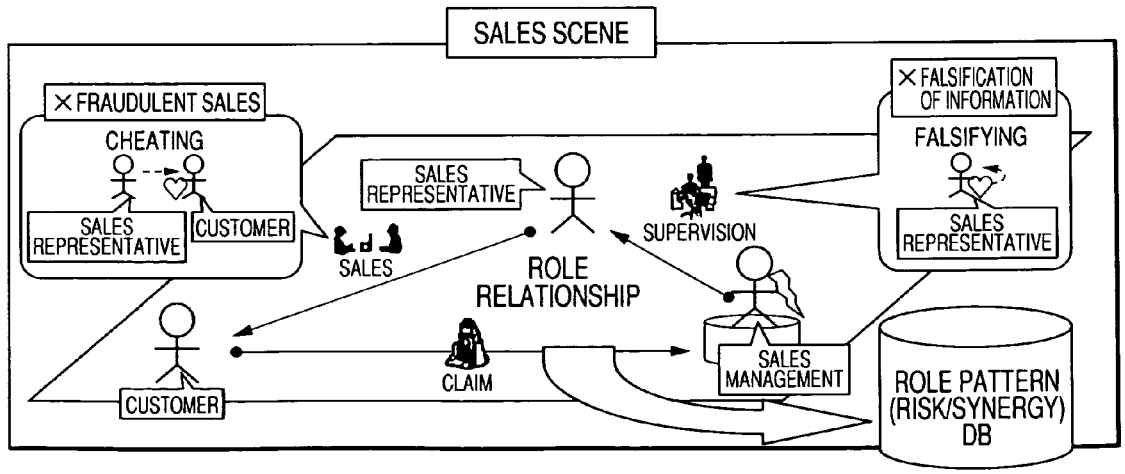
FIG. 21 is a diagram explaining a scene for extracting risk/energy factors according to role relationships.

Further, the term "role relationship" is aggregation of relationships among roles which each actor has, like the conceptual drawing for extracting risk/synergy factors based on role relationships shown in FIG. 21, and a single role relationship exists in a single scene.

FIG. 21 illustrates an example of risks that occur in association with role relationships among actors in a sales scene. The "fraudulent sales" and "falsification of information" marked with X in FIG. 21 are examples of risks. Patterns of role relationships among actors are formed and stored in the role pattern storage unit 321 as a role pattern DB (database).

(4) Risk/Synergy Evaluation System 3

Figure 24:
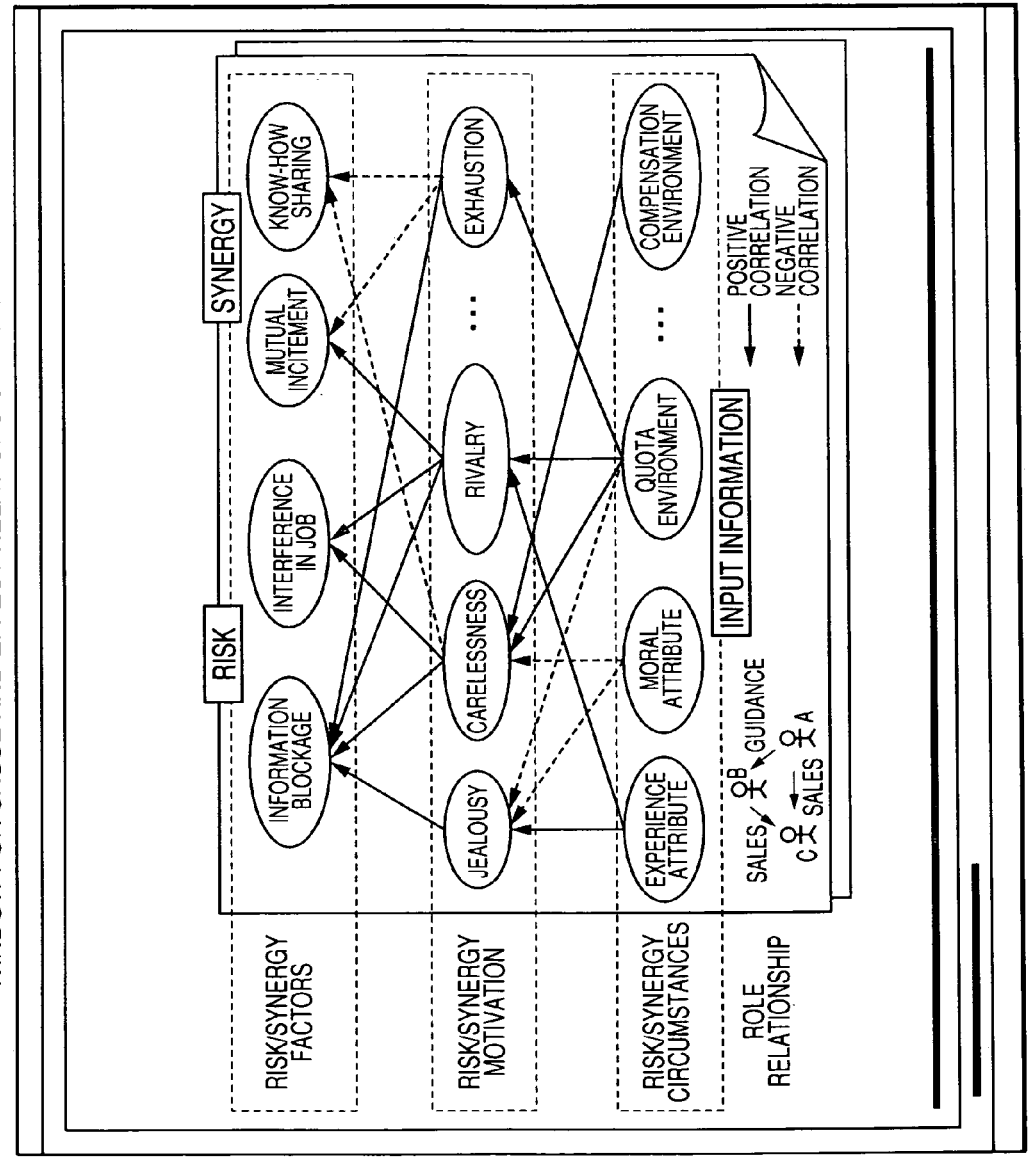
FIG. 24 is a diagram showing an example window for analysis of cause-and-effect relations of risk/synergy.

In the risk/synergy evaluation system 3 in FIG. 2, the role pattern storage unit 321 stores, under a multi-layer network structure for each role relationship as shown in the window for risk/synergy cause-and-effect relationship in FIG. 24, definition information of risk/synergy cause-and-effect such as circumstances related to occurrence of risk/synergy (i.e. experience attribute, quota environment, etc.), motivations which generate risk/synergy (i.e. defensiveness, conflict of interests, rivalry, etc.), factors for occurrence of risk/synergy (i.e. risk of information blockage, risk of job interference, synergy obtained by being motivated with each other, synergy obtained by sharing know-how, etc.), and relationship among circumstances, motivations and factors as well as degrees of relationships (i.e. degree of relationship between experience attribute and carelessness of actor A=0.5).

FIG. 24 illustrates an example of risk/synergy cause-and-effect relationship to be displayed by the risk/synergy extraction unit 301 on the output device 2008. Risk/synergy circumstances indicate elements of actor's attribute and actor's environment defined by role relationships. Each element of actor's attribute or actor's environment has a degree of influence on factors of jealousy, carelessness, rivalry, exhaustion, etc. which are listed as risk/synergy motivations. The degree of influence can be expressed as a positive or negative correlation coefficient. Further, each element of risk/synergy motivation has a degree of influence that can be expressed as a positive or negative correlation coefficient to each factor of the risk/synergy factors. The "information blockage" and the "job interference" are examples of risks, and the "mutual incitement" and the "know-how sharing" are examples of synergy. FIG. 24 shows an example that three layers exist from the risk/synergy circumstances of the lowest layer to the risk/synergy factors of the highest layer, and risk/synergy motivation is provided for the intermediate layer. In the case of a two-layer structure, each element of the risk/synergy circumstances has a degree of influence directly on each factor of risk/synergy.

The risk/synergy extraction unit 301 includes functions to extract risk/synergy factors and occurrence mechanism information from the role relationship information received from the business process definition system 2 according to the definition information of risk/synergy cause-and-effect that is stored in the role pattern storage unit 321, store the factors and the information in the risk/synergy information storage unit 323, and transmit them to the business process definition system 2 and the risk/synergy measures support system 4.

The profit-and-loss information storage unit 322 stores profit-and-loss definition information such as the occurrence frequency and the amount of profit and loss. The risk/synergy profit-and-loss calculation unit 302 includes a function to obtain an estimated profit-and-loss value (for example, estimated profit-and-loss value of information blockage risk=loss of 15 million yen/year) from the risk/synergy factors and the occurrence mechanism information extracted by the risk/synergy extraction unit 203, based on the profit-and-loss definition information of the profit-and-loss information storage unit 322, and transmit the estimated values to the business process definition system 2 and the risk/synergy measures support system 4.

The basic evaluation information setting unit 303 includes functions to set and manage the risk/synergy cause-and-effect definition information of the role pattern storage unit 321 and the profit-and-loss definition information of the profit-and-loss information storage unit 322.

(5) Risk/Synergy Measures Support System 4

In the risk/synergy measures support system 4 shown in FIG. 2, the measures pattern storage unit 421 stores measures pattern information such as measures candidates and effects of measures for each risk/synergy factor. The term "effects of measures" used here means whether the measures will act positively or negatively, as well as the strength of such an action (for example, the value of carelessness −1 if there is an action to prevent carelessness, etc.). The risk/synergy measures evaluation unit 401 includes functions to extract candidates for risk/synergy measures and calculate estimated effects from the risk/synergy factors and the occurrence mechanism information received from the risk/synergy evaluation system 3 according to the measures pattern information of the measures pattern storage unit 421, and transmit the candidates and calculated result to the business process definition system 2.

The measures requirements extraction unit 402 includes functions to extract measures requirements for risk/synergy factors from the risk/synergy factors and the occurrence mechanism information and transmit the requirements to the business process definition system 2.

The basic measures information setting unit 403 includes functions to set and manage the measures pattern information of the measures pattern storage unit 421.

(6) Business Process Design Supporting Process

Figure 4:
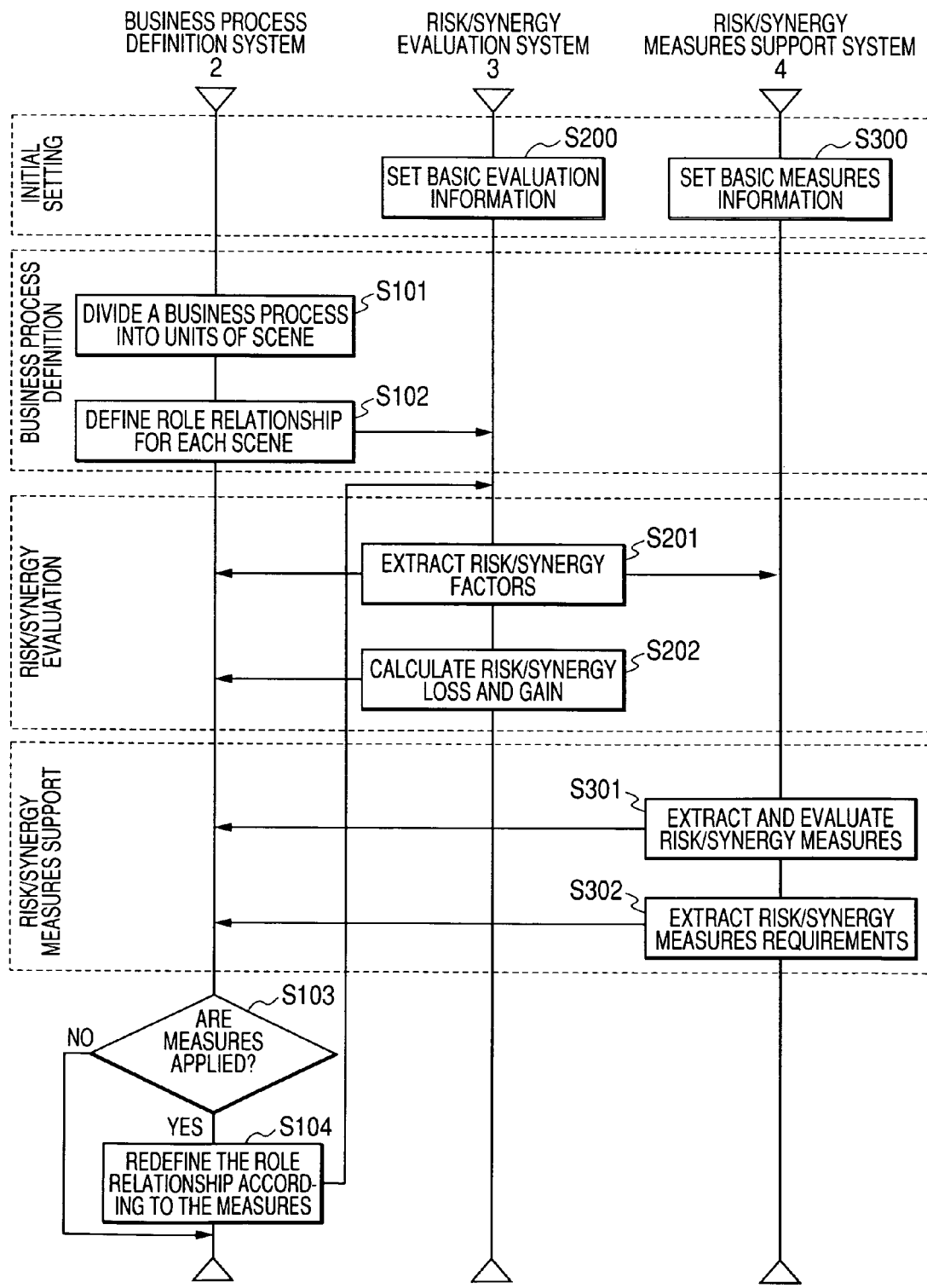
FIG. 4 is a flow chart showing the process flow to extract/evaluate risk/synergy factors arising out of role relationships among persons in a business process.

FIG. 4 illustrates a flow chart showing the process flow concerning extraction/evaluation of risk/synergy factors arising out of role relationships among persons and a measures supporting method in a business process design support system according to the embodiment. In FIG. 4, the flow shows the case where the business process definition system 2 receives role relationship information, which is definition information, from a business process designer, etc., the risk/synergy evaluation system 3 extracts risk/synergy factors and calculates estimated profit-and-loss values, and the risk/synergy measures support system 4 extracts candidates for the risk/synergy measures, calculate estimated effects and extract measures requirements. In addition, the process shown in FIG. 4 can be realized by executing the programs by the CPUs in each of the business process definition system 2, the risk/synergy evaluation system 3 and the risk/synergy measures support system 4.

Processing steps S101 to S104 show processing to be executed by the business process definition system 2, processing steps S200 to S202 show processing to be executed by the risk/synergy evaluation system 3, and processing steps S300 to S302 show processing to be executed by the risk/synergy measures support system 4.

(7) Initial Setting

Description will be made of the flow shown in FIG. 4. First, for the initial setting, the risk/synergy evaluation system 3 executes basic information setting for extraction of risk/synergy factors and calculation of risk/synergy profit and loss in the manner as shown below (Processing Step S200).

As shown in FIG. 12, the basic evaluation information setting unit 303 of the risk/synergy evaluation system 3 registers role patterns, information of risk/synergy cause-and-effect, etc. according to the number of actors in the role pattern list T321 of the role pattern storage unit 321. The role pattern list shown in FIG. 12 expresses role patterns as well as types of information of risk/synergy cause-and-effect in the case of the number of actors 2, 3, 4 or more by using symbols. The role pattern is a type of the role relationships to be defined.

Further, the basic evaluation information setting unit 303 registers role relationships among actors for each role pattern in a role pattern T321a of the role pattern storage unit 321, as shown in FIG. 13. FIG. 13 shows a pattern in the case of the role pattern of 3a, and the figure indicates that an actor A plays the role of guidance to an actor B and the role of selling to an actor C, while the actor B plays the role of selling to an actor C.

Further, the basic evaluation information setting unit 303 registers, for each role pattern, weight of the degree of influence on motivation given by the risk/synergy circumstances on definition information of risk/synergy cause-and-effect "circumstances→motivation" T321b1 of the role pattern storage unit 321, as shown in FIG. 14. FIG. 14 indicates degree of influence for motivation attribute of each actor in correlation coefficients (weights) based on the circumstances attribute of each actor in the case where the information of risk/synergy cause-and-effect is of R/S3a. The correlation coefficient is expressed with a value ranging from 1.0 to −1.0, and the value 0 indicates that there is no relationship.

Further, the basic evaluation information setting unit 303 registers weight of the degree of influence on the risk/synergy factors given by motivation in a definition information of risk/synergy cause-and-effect "motivation→risk/synergy factor" T321b2 of the role pattern storage unit 321, as shown in FIG. 15. FIG. 15 indicates degree of influence for risk factors and synergy factors in correlation coefficients (weights) based on the motivation attribute of each actor in the case where the information of risk/synergy cause-and-effect is of R/S3a.

The basic evaluation information setting unit 303 of the risk/synergy evaluation system 3 registers categories, occurrence frequency, amount of profit and loss, etc. of risk or synergy for each risk/synergy factor in a profit-and-loss information T322 of the profit-and-loss information storage unit 322, as shown in FIG. 18.

Here, FIG. 22 shows a conceptual drawing of the role pattern T321a shown in FIG. 13. In FIG. 22, an actor B (banker) has a role of selling to an actor C (customer), and an actor A (temporary staff FA) has a role of selling to the actor C (customer) and a role of guidance to the actor B (banker), respectively. In addition, setting is made so that weight increases as the degree of influence between circumstances and motivation, and between motivation and factors become higher. With the embodiment, a positive correlation is expressed in a positive value and a negative correlation in a negative value, indicating the maximum value of the positive correlation as +1, the maximum value of the negative correlation as −1, and no correlation as 0. With respect to setting a weight, there are a method for calculating a weight by using a statistical method based on past risk/synergy occurrence cases, and a method for calculating a weight according to definition created by a person in charge of business or a business consultant based on their past experiences. In the case of calculating a weight by using a statistical method, there is a method in which the degree of influence among layers is set to be independent, and a method in which stochastic processes are derived with mechanical learning represented by a Bayesian network, assuming that degrees of influence among a plurality of layers are interrelated. The embodiment shows the case where degrees of influence among layers are independent. In addition, with the embodiment, the risk/synergy cause-and-effect relationship is indicated in three layers as shown in FIG. 24, it is also possible to reduce the layers to two or increase them to four or over.

Now turning to FIG. 4, for initial setting, the risk/synergy measures support system 4 executes basic information setting for extracting candidates for risk/synergy measures and estimated effects as well as for extracting measures requirements in the manner as shown below (Processing step S300).

The basic measures information setting unit 403 of the risk/synergy measures support system 4 registers measures candidates, measures categories (awareness raising, work restructuring, organizational reform), target categories (avoidance, loss prevention, loss reduction, transfer/possession), measures effect (carelessness−1), etc. in a measures pattern list T421 of the measures pattern storage unit 421, as shown in FIG. 19. FIG. 19 indicates a measures pattern in the case where the risk/synergy factor is "information blockage."

In the column of measures effects in the measures pattern list T421 shown in FIG. 19, numbers are set to indicate whether the measures act positively or negatively for each element of motivation and environment of risk/synergy, and magnitude of effects. In addition, information registered in the measures pattern list T421 is indicated as shown in FIG. 26, thereby supporting to examine measures by the business process designer, etc. In FIG. 26, the target categories for risk/synergy measures show whether or not effects in each measures category are expected, and the magnitude level of effects of each measures is displayed by the business process definition system 2. The estimated effects are calculated based on the measures effect shown in FIG. 19.

(8) Business Process Definition

A description will be made of a processing step for dividing a business process into units of scene and receiving definition information on role relationships related to each scene, in the case where a business process designer, etc. newly builds, modifies or restructures a business process. Here, it is intended to support rapid and correct division of the business process by using business process patterns and provide a definition environment of role relationships with high visibility and understanding easiness by means of a graphical user interface shown in FIG. 22.

Now turning back to FIG. 4, the business process definition unit 201 of the business process definition system 2 receives a business pattern T221 shown in FIG. 7 that is stored in the business process pattern storage unit 221 of the business process definition system 2, extracts a business process pattern (transaction reception→reception acknowledgment→order inspection→order on market→contract notice→settlement→transaction report) according to a job name (stock brokerage job, etc.) that was received from a business process designer, etc. as definition information, and divides the business process in units of scene (Processing step S101). For example, the "transaction reception" is defined at least as one scene.

The business process definition unit 201 of the business process definition system 2, as definition information of role relationship from a business process designer, etc. through a graphical user interface shown in FIG. 22, receives inputs of role definition information such as a scene name (transaction reception), the number of actors (3 actors), an actor attribute (Attribute: 1), a role relationship among actors (Role: 1) and an environment to which the actor is subjected (Environment: 1) to a role relationship definition T222 shown in FIGS. 8 to 11 of the role relationship definition storage unit 222 (Processing step S102). Here, the actor attribute (Attribute: 1) is defined like an attribute for each actor (for example, experience attribute of actor A=1.9) in an actor's attribute definition T222a shown in FIG. 9 of the role relationship definition storage unit 222. The role relationship among actors is defined like a role (for example, the actor A guides the actor B) in an actor's role definition T222b shown in FIG. 10 of the role relationship definition storage unit 222. The environment to which actors are subjected is defined like an environment for each actor (for example, the quota environment of actor A=1.7) in an actor environment definition T222c shown in FIG. 11 of the role relationship definition storage unit 222. With the embodiment, the definition value is set in the range from 1 to 2, wherein the case of the strongest effect shall be set to 2 and the case of the weakest effect shall be set to 1.

(9) Risk/Synergy Evaluation

Figure 23:
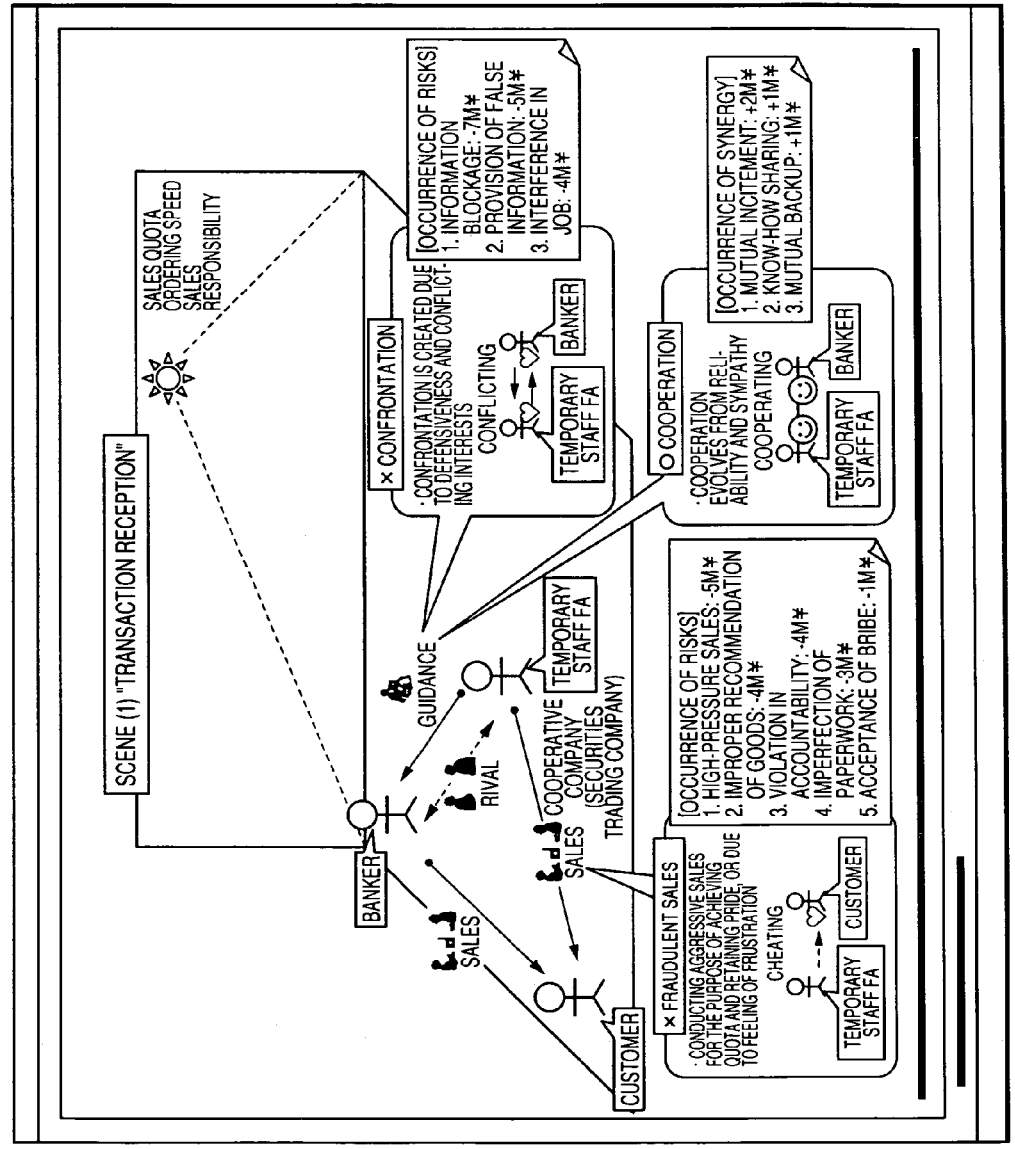
FIG. 23 is a diagram showing an example window for analysis of risk/synergy factors.

A method for extracting risk/synergy factors that exist behind role relationship in accordance with role relationship information defined by a business process designer, etc. will be described. Here, it is intended that designing of role balance is supported by automatically extracting risk/synergy factors in role relationship among persons that is the essential part of a business process, thus building a business process rapidly and correctly. FIG. 23 shows a window for analysis of risk/synergy factors. In FIG. 23, risks of confrontation and fraudulent sales as well as synergy of cooperation are extracted based on role relationships among a temporary staff FA, a banker and a customer. FIG. 23 indicates, concerning the scene of "transaction reception", risks (marked with X) and synergies (marked with ○) that are likely to occur for each role relationship, and the figure also indicates factors of profit and loss arising out of risk occurrence or synergy occurrence as well as the amount of profit and loss of each factor.

Now referring to FIG. 4, the risk/synergy extraction unit 301 of the risk/synergy evaluation system 3 extracts risk/synergy factors based on the role relationship information received from the business process definition system 2 (Processing Step S201). Details of Processing Step S201 show in processing steps S2011 to S2013 in the flow chart shown in FIG. 5.

Figure 5:
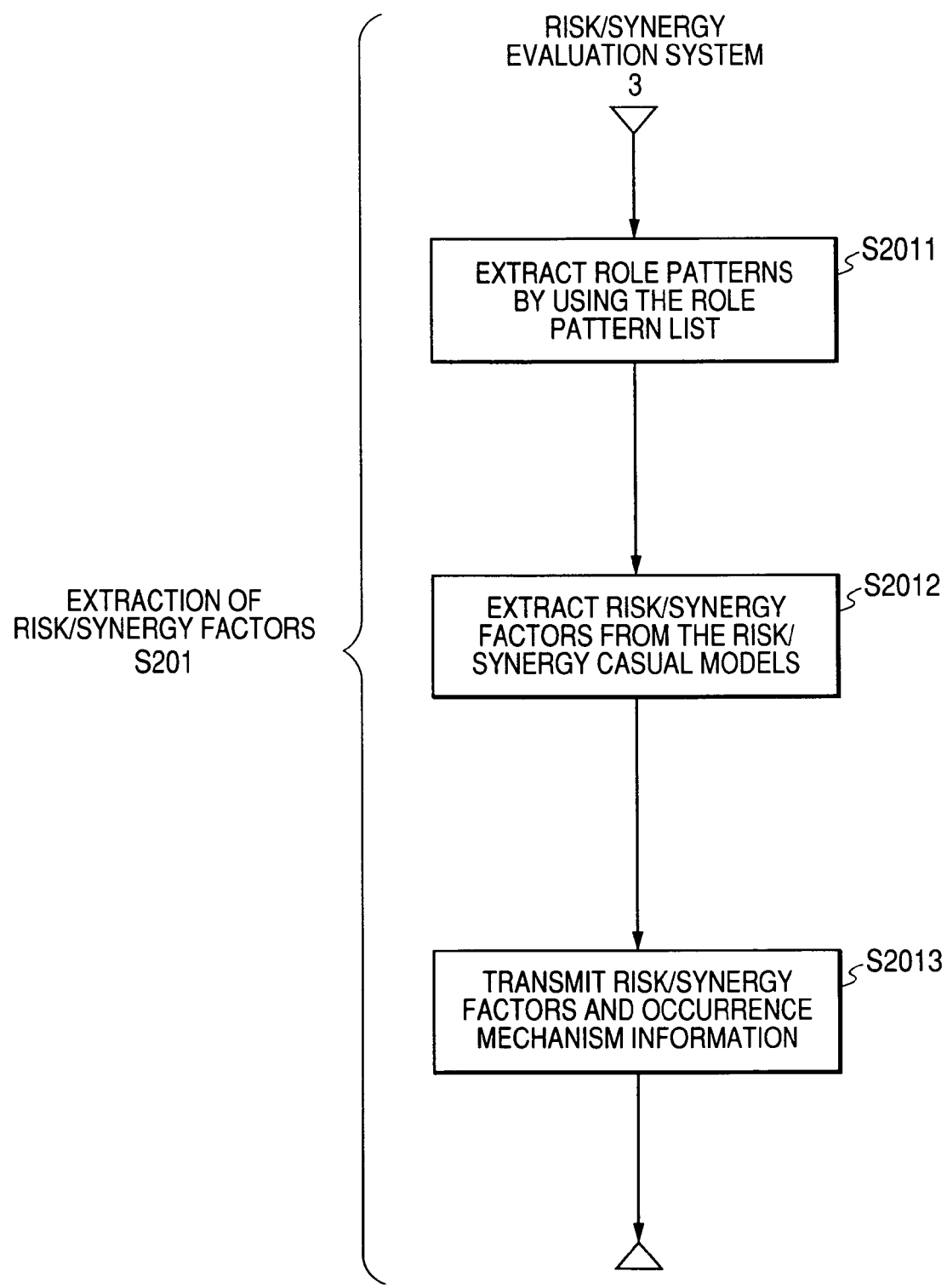
FIG. 5 is a flow chart showing the process flow to extract risk/synergy factors.

Here, description will be made of FIG. 5. FIG. 5 is a flow chart showing the process flow to extract risk/synergy factors based on role relationship information. The risk/synergy extraction unit 301 of the risk/synergy evaluation system 3 executes matching of the actor's role definition T222b shown in FIG. 10 for each scene based on the role relationship information received from the business process definition system 2 and the role patterns of the role pattern lists T321 shown in FIGS. 12 and 13 of the role pattern storage unit 321, and extracts the matched role patterns (Processing step S2011). For example, as a role pattern that matches the role relationship (Role: 1) of the transaction reception scene, a role pattern (3a) is extracted from the role pattern lists.

The risk/synergy extraction unit 301 of the risk/synergy evaluation system 3, concerning the type of cause-and-effect information associating with the extracted role patterns, extracts risk/synergy factors from risk/synergy casual models (Processing step S2012). The risk/synergy extraction unit 301 multiplies the definition value of the actor's attribute definition T222a shown in FIG. 9 for each scene (for example, for Attribute: 1, definition value of "actor A's experience attribute A"=1.9, etc.), the definition value of the actor's environment definition T222c (for example, for Environment: 1, definition value of "actor A's quota environment A=1.7, etc.), and weight of degree of influence of the definition information of risk/synergy cause-and-effect "circumstances→motivation" T321b1 shown in FIG. 14 of the role pattern storage unit 321 to calculate the occurrence frequency, calculates the total occurrences by totaling occurrences for each motivation, and stores, as occurrence mechanism information, the occurrence frequency and the total occurrences of each element of the cause-and-effect models in the risk/synergy occurrence mechanism information "circumstances→motivation" of the risk/synergy information storage unit 323 shown in FIG. 16. For example, when focusing attention on the actor A's motivation "→jealousy A" shown in FIG. 14, the total occurrences of the actor A's motivation "→jealousy A" (=3.9) is calculated by multiplying weight which is not zero (0) in the direction of columns (weight of "moral attribute A→jealousy A") with a corresponding definition value (definition value of "actor A's moral attribute A"=1.3), etc., calculating occurrence frequency of "moral attribute A→jealousy A" (−0.3×1.3=−0.39, etc.), and totaling respective occurrence frequency in the direction of columns, and the total occurrences is stored in the table. Further, the total occurrences (=3.9) is multiplied with the weight of degree of influence of the definition information of risk/synergy cause-and-effect "motivation→factors" T321b2 shown in FIG. 15 of the role pattern storage unit 321 to calculate the occurrence frequency, the total occurrences is calculated by aggregating the occurrence frequency for each risk/synergy factor, and the occurrence frequency and the total occurrences are stored as occurrence mechanism information in a risk/synergy occurrence mechanism information "motivation→factors" T323b2 shown in FIG. 17. For example, when focusing attention on information blockage risk shown in FIG. 15, the total occurrences (total occurrences of actor A's motivation "→jealousy A" for the corresponding motivation=3.9) is multiplied with the weight that is not zero (0) in the direction of columns (weight of "jealousy A→information blockage"=0.5"), the occurrence frequency of "jealousy A→information blockage" (0.5×3.9=1.95) is calculated, the total occurrences of the information blockage risk (4.5) is calculated by aggregating each occurrence frequency in the direction of columns, and the result is stored in the table.

The risk/synergy extraction unit 301 of the risk/synergy evaluation system 3 transmits the risk/synergy factors and the occurrence mechanism information to the business process definition system 2 and the risk/synergy measures support system 4 via the communication network 5 (Processing step S2013).

Now turning back to FIG. 4, the risk/synergy profit-and-loss calculation unit 302 of the risk/synergy evaluation system 3 calculates an estimated profit-and-loss value based on the profit-and-loss information T322 shown in FIG. 18 of the profit-and-loss information storage unit 322 from the risk/synergy factors and the occurrence mechanism information extracted in the risk/synergy extraction unit 301 (Processing step S202). The estimated profit-and-loss value is calculated by multiplying the occurrence frequency for each risk/synergy factor (information blockage, for example) (1.5 times/year) with the amount of profit and loss (−10 million yen/time) (estimated profit-and-loss value of the information blockage=1.5×(−1000)=−1.5 million yen/year). The risk/synergy profit-and-loss calculation unit 302 transmits the calculation result to the business process definition system 2 via the communication network 5. Further, for a method for calculating an estimated profit-and-loss value, the profit-and-loss estimated value may be adjusted according to weight based on the total occurrences for each risk/synergy factor, for example.

FIG. 25 shows a window for distribution (risk map) of risk factors which displays the relationship between an estimated profit-and-loss value and the occurrence frequency of each risk/synergy factor. Positions of respective risk/synergy factors are plotted, with the amount of loss shown on the horizontal axis and the occurrence frequency on the vertical axis.

(10) Risk/Synergy Measures Supporting

A method for supporting risk/synergy measures that support planning and designing of measures for risk/energy factors arising out of role relationships will be described. Here, it is intended to support building of rapid and correct measures by providing measure patterns for risk/synergy factors, as well as by extracting and displaying estimated effects of the measures. FIG. 26 shows a conceptual diagram showing a window for evaluation of risk/synergy measures that is displayed by the business process definition system 2. In FIG. 26, measures patterns and estimated effects are extracted for risk factors of information blockage.

Now turning back to FIG. 4, the risk/synergy measures evaluation unit 401 of the risk/synergy measures support system 4 extracts and evaluate risk/synergy measures based on the risk/synergy factors and the occurrence mechanism information received from the risk/synergy evaluation system 3 (Processing step S301). Details of Processing step S301 show in processing steps S3011 to S3013 in the flow chart shown in FIG. 6.

Figure 6:
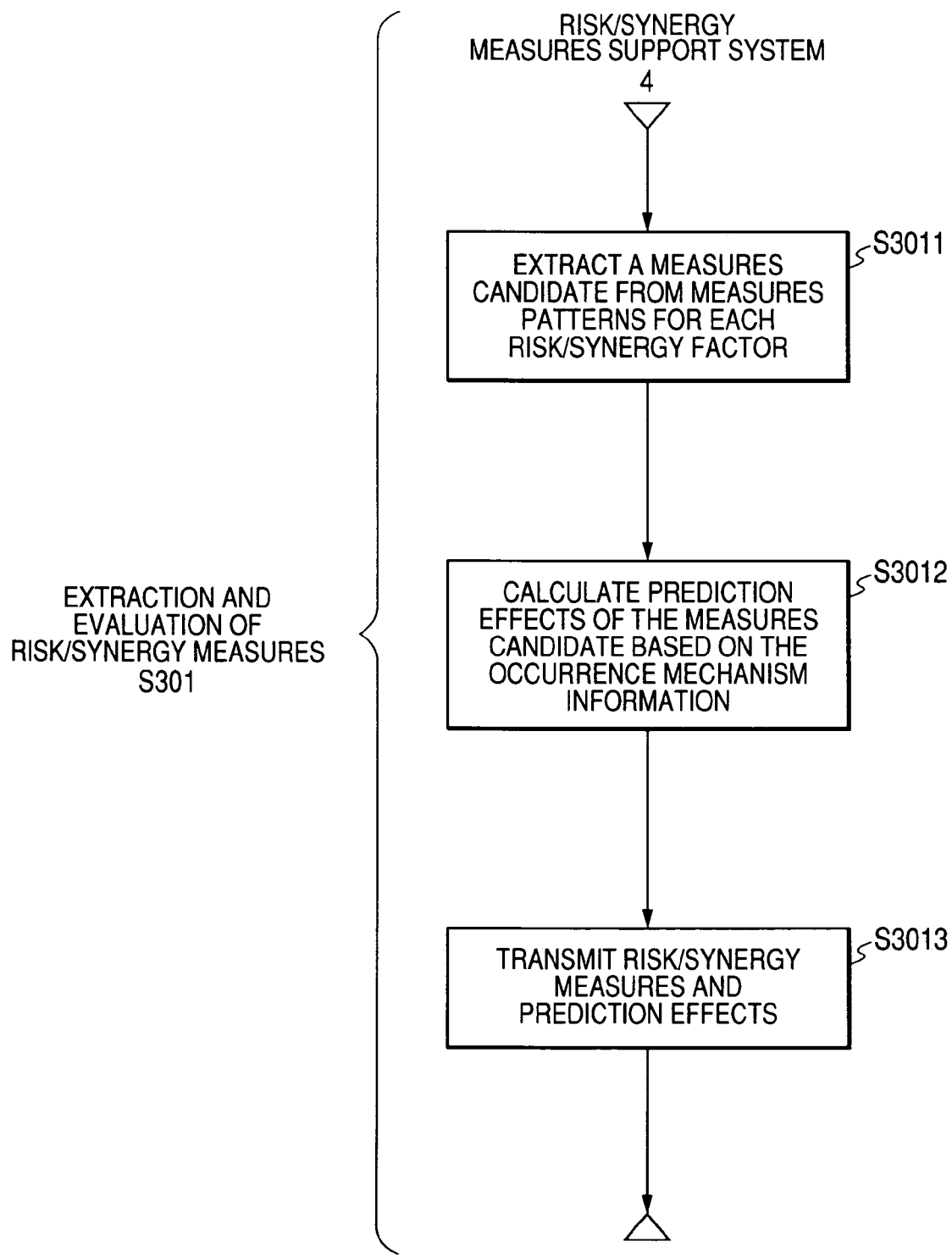
FIG. 6 is a flow chart showing the process flow to extract/evaluate risk/synergy measures.
Figure 20:
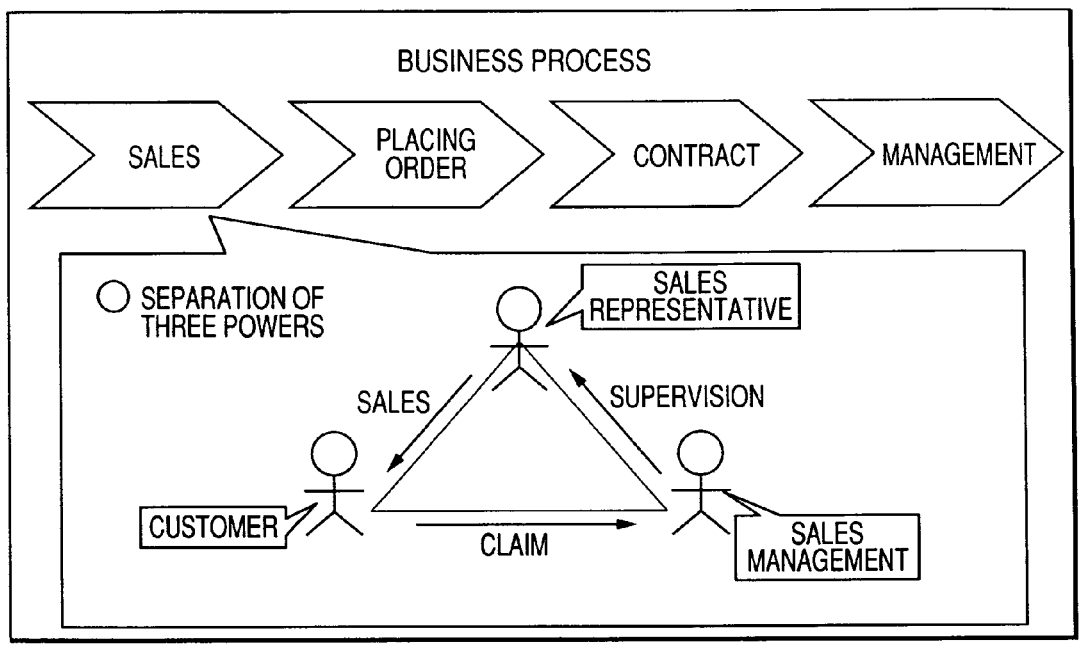
FIG. 20 is a diagram explaining an example of role relationship in a business process.

Here, description is made of FIG. 6. FIG. 6 is a flow chart showing the process flow to extract candidates for risk/synergy measures and estimated effects based on role relationship information. The risk/synergy measures evaluation unit 401 of the risk/synergy measures support system 4 extracts, from the risk/synergy factors and the occurrence mechanism information received from the risk/synergy evaluation system 3, measures candidates (education on job rules, disclosure of fraud, job supervision, etc.) for each risk/synergy factor (information blockage, for example) based on the measures pattern T421 shown in FIG. 19 of the measures pattern storage unit 421 (Processing step S3011).

The risk/synergy measures evaluation unit 401 of the risk/synergy measures support system 4 calculates, based on occurrence mechanism information (occurrence mechanism of information blockage risk, for example) of risk/energy factors, degree of influence on risk/synergy circumstances, motivation, etc. as estimated effects for each measures candidate extracted (job rule education, for example), by using measures effects of the measures pattern T421 shown in FIG. 19 of the measures pattern storage unit 421 (Processing step S3012). To measure the degree of influence, for example, the total occurrences and the measures effects of motivations in the occurrence mechanism information of risk/synergy are added ({total occurrences of carelessness=1.2}+{measures effects of job rule education "carelessness−1"=1.2+(−1)= 0.2}. More specifically, it is possible for the risk/synergy measures evaluation unit 401 to determine the degree of improvement in the total occurrences after applying the measures, by re-calculating the occurrence mechanism information shown in FIGS. 16 and 17 using numerical values of measures effects, and by comparing the calculation result with the original total occurrences.

The risk/synergy measures evaluation unit 401 of the risk/synergy measures support system 4 transmits measures candidates and estimated effects for each risk/synergy factor to the business process definition system 2 via the communication network 5 (Processing step S3013). The business process definition system 2 displays such information.

Turning back to FIG. 4, the measures requirements extraction unit 402 of the risk/synergy measures support system 4 extracts (lists up factors having high occurrence frequency) major motivations and circumstances that cause risk/energy factors as measures requirements from the occurrence mechanism information extracted in the risk/synergy extraction unit 301, and transmits them to the business process definition system 2 via the communication network 5 (Processing step S302).

(11) Role Relationship Redefinition

The business process definition unit 201 of the business process definition system 2 receives inputs concerning the presence or absence of measures execution determined by the business process designer, etc. based on risk/synergy factors, occurrence mechanism information, estimated profit-and-loss values, measures candidates, estimated effects, measures requirements, etc. (Processing step S103).

If the measures execution is YES, the business process definition unit 201 receives the definition information of role relationship in the same manner as Processing step S102 and transmit the information to the risk/synergy evaluation system 3 (Processing step S104). Re-inputting of role relationship definition information includes processing for modifying and inputting magnitude of influence for attributes and elements of each actor.

Thereafter, processing steps S201, S202, S301, S302, S103 and S104 are repeated in this order until the measures execution turns to be NO in Processing step S103. More specifically, the measures execution is repeated until the business process designer determines that there is no problem in the design of role balance. With such arrangement, it is possible to build a safe and correct business process which adequately includes measures for risk/synergy factors arising out of role relationships among persons.

The description stated above is intended for facilitating understanding of the present invention and not intended to limit the present invention. The present invention may of course be modified and improved without departing from the gist of the present invention and the present invention includes equivalents of such modifications and improvements.

According to the present invention, when newly building, modifying and re-structuring a business process, it is possible to provide a business process design supporting technology for rapidly and correctly building a highly-reliable business process, by visualizing role relationships among persons which is the essential part of the business process, extracting risk/synergy factors arising out of role relationships, and evaluating and executing measures based on the occurrence mechanism of the risk/synergy factors.

What is claimed is:

1. A method executed by a computer for generating information relating to risk factors or synergy factors (risk/synergy factors) that influence a business process, the method being based on role relationships among two or more actors who are involved in each scene of the business process, the risk factors being factors associated with loss and the synergy factors being factors associated with profits, the method comprising the steps of:

receiving role relationship information showing the role relationship among the two or more actors;

receiving a definition value for each of the two or more actors, wherein the definition value is associated with each of the two or more actors and defined for elements to indicate the influence of each of the elements on the factors;

selecting a pattern of the role relationship information by matching the received role relationship information with each pattern of role relationships stored on a storage device, the storage device being disposed in the computer and storing definition information of risk/synergy cause-and-effect for each pattern of the role relationships among the two or more actors, the definition information includes a factor predetermined, an element influencing the factor, and a weight value which is defined for the element and for each of the two or more actors and indicates the influence of the element on the factor;

wherein the definition information of risk/synergy cause-and-effect indicates a plurality of elements influencing the factors, and weight values for each of which is defined for each of the elements and for each of the two or more actors and indicates the influence of the element on the factors and the definition information of risk/synergy cause-and-effect includes a higher layer including a plurality of factors influencing the business process, a lower layer including the plurality of elements, and at least one intermediate layer which exists between the lower layer and the higher layer and includes a plurality of intermediate elements, each of which associates at least one of the plurality of elements with one of the plurality of factors;

wherein the definition information further includes:
first weight values, each of which is defined for each of the elements, each of the two or more actors, and each of the intermediate elements associated with each of the elements, and indicates the influence of each of the elements on each of the intermediate elements associated with each of the elements, and second weight values, each of which is defined for each of the intermediate elements and each of the factors, and indicates the influence of the intermediate elements on each of the factors associated with each of the intermediate elements;

wherein the receiving the definition value further includes receiving definition values for each of the two or more actors, wherein the definition values are associated with each of the two or more actors and the definition values for each of the elements to indicate the influence of each of the elements on each of the intermediate elements associated with each of the elements;

extracting the definition information of risk/synergy cause-and-effect corresponding to the selected pattern of role relationships;

generating a sum of values by multiplying, for each of the plurality of elements and for each actor involved in the role relationship, the weight value stored on the extracted definition information with each of the definition values;

wherein generating the sum of values further includes:

generating a first sum of first values for each of the intermediate elements by multiplying, for each of a plurality of elements influencing the intermediate element and for each actor involved in the role relationship, the weight value corresponding to each of the actors involved in the role relationship and stored in the extracted definition information of risk-synergy cause-and-effect with the definition value of each of the actors involved in the role relationship;

generating a second sum of second values for each of the factors by multiplying, for each of a plurality of intermediate elements influencing to the factors, the weight value corresponding to the intermediate element stored in the extracted definition information of risk/synergy cause-and-effect with the first sum of each of the intermediate elements; and storing the sum and the second sum of second values in the storage device.

2. The method according to claim 1 further comprising a step of calculating an estimated profit-loss value by multiplying the sum with an amount of profit and loss with reference to a profit-loss information table;

wherein the profit-and-loss information table is stored in the storage device and includes the sum and an amount of profit and loss to be generated in case of occurrence of the factor.

3. The method according to claim 1, wherein:

the storage device further stores a measure pattern table that includes measure candidates to be taken for the factor, and measure-effect value indicating the influence of the measure candidates on weight value of the factor measure-effect;

generating the sum of values includes generating a new sum of new values by multiplying, for each actor involved in the role relationships, a new weight value with the definition value, wherein the new weight value is obtained from the measure-effect value and the weight value corresponding to the actor stored on the extracted definition information of risk/synergy cause-and-effect with referencing to the measure pattern table; and the method further comprises a step of displaying the measure candidates and the new sum as estimated effect of measure on the display device.

4. The method according to claim 3, wherein the method further comprises steps of:

receiving an input whether or not the measure candidate is executed; and changing weight value of the element and executing again the generating step and the displaying step when the measure candidate is executed.

5. A system for generating information for risk factors or synergy factors (risk/synergy factors) that influence a business process, the system generates the information based on role relationships among two or more actors who are involved in each scene of the business process the risk factors being factors associated with loss and the synergy factors being factors associated with profits, the system comprising:

a storage for storing the factors predetermined, as a definition information of risk/synergy cause-and-effect, and weight values which are defined for each of the two or more actors, as degree of influence for elements that influence the factors, for each of patterns of the role relationships among two or more actors;

a CPU comprising:

means for receiving the role relationships among two or more actors;

means for defining the definition information of risk/synergy cause-and-effect, defining a plurality of elements influenced to the factors, and defining weight values for each of the two or more actors as degree of influence of a target element to the factor for each of the plurality of elements;

means for constructing the definition information of risk/synergy cause-and-effect with a higher layer including the plurality of factors, and a lower layer including the plurality of factors, and at least one intermediate layer which exists between the lower layer and the higher layer and includes a plurality of intermediate elements, each of which relates at least one of the plurality of elements to one of the plurality of factors, the definition information of risk/synergy cause-and-effect includes a first weight value defined for each of actors as degree of influence to each of intermediate elements related to a target element for each of the plurality of elements, and a second weight value defined as degree of influence to each of factors related to a target intermediate element for each of the plurality of intermediate elements;

means for receiving a definition values associated with each of the two or more actors indicating a degree of influence to the factors from the elements, a definition value inherent to each of the two or more actors indicating degree of influence to the factor from the target element, and a definition value inherent to each of the two or more actors indicating degree of influence to each of intermediate elements related to a target element for each of the plurality of elements;

means for searching information stored in the storage device;

means for selecting a pattern of the role relationships by matching the received role relationships with the pattern of role relationships stored on the storage device;

means for extracting the definition information of risk/synergy cause-and-effect corresponding to the selected pattern of role relationships;

means for calculating values by multiplying the weight value of a target element of a target actor stored in the extracted definition information of risk/synergy cause-and-effect with the definition value of the target element of the target actor, for each of the two or more actors included in the role relationships, and calculating total value by totaling the calculated values for each of the plurality of elements of each of the two or more actors, wherein the calculating further comprises:

for each of the intermediate elements and each of a plurality of elements that influence the intermediate elements, calculating a first value by multiplying the first weight value corresponding to the actor stored in the extracted definition information of risk/synergy cause-and-effect with the definition value of a target actor, for each of the two or more actors included in the role relationships, and calculating a first total value totaling the first values for each of the intermediate elements;

for each of the factors and each of a plurality of intermediate elements that influence the factors, calculating a second value by multiplying the second weight value corresponding to a target intermediate element stored in the extraction definition information of risk/synergy cause-and-effect with the first total value of a target intermediate element, and calculating a second total value totaling the second values for each of the factors; and means for storing to the storage device the total value as risk/synergy occurrence mechanism information.

6. The system according to claim 5, wherein:

the storage device further stores a profit-and-loss information table that includes the total value and an amount of profit and loss to be generated in case of occurrence of the factor; and the CPU further comprises means for calculating an estimated profit-and-loss value by multiplying the total value with the amount of profit and loss, by referring to the profit-and-loss information table.

7. The system according to claim 5, wherein:

the storage device further stores a measure pattern table that includes measure candidates to be took for the factor and measure-effect value indicating degree of influence to weight value of the factor from the measure candidate as measure-effect;

the means for calculating comprises:

for each of a plurality of actors included in the role relationships, means for defining a new weight value adding the measure-effect value to the weight value corresponding to a target actor stored on the extracted definition information of risk/synergy cause-and-effect, by referring to the measure pattern table; and means for calculating a new value by multiplying the definition value of target actor with the new weight value, and calculating a new total value by totaling the new values calculated for each of the plurality of actors;

the CPU further comprises means for displaying the measure candidates and the new total value as estimated effect of measure on the display device.

8. The system according to claim 7, wherein the CPU further comprises:

means for receiving an input whether or not the measure candidate is executed; and means for changing weight value of the element and executing again the means for calculating sand the means for displaying when the measure candidate is executed.

* * * * *